United States Patent
Zhang

(10) Patent No.: US 7,891,889 B2
(45) Date of Patent: Feb. 22, 2011

(54) CAMERA MODULE AND PORTABLE ELECTRONIC DEVICE USING SAME

(75) Inventor: Yu Zhang, Shenzhen (CN)

(73) Assignees: Shenzhen Futaihong Precision Industry Co., Ltd., ShenZhen, Guangdong province (CN); FIH (Hong Kong) Limited, Kowloon (HK)

( * ) Notice: Subject to any disclaimer, the term of this patent is extended or adjusted under 35 U.S.C. 154(b) by 0 days.

(21) Appl. No.: 12/605,703

(22) Filed: Oct. 26, 2009

(65) Prior Publication Data

US 2010/0158500 A1 Jun. 24, 2010

(30) Foreign Application Priority Data

Dec. 22, 2008 (CN) .......... 2008 1 0306431

(51) Int. Cl.
*G03B 17/02* (2006.01)
*H04N 7/14* (2006.01)

(52) U.S. Cl. .......... 396/428; 396/541; 348/14.02; 348/376; 455/556.1

(58) Field of Classification Search .......... 396/428, 396/429, 439, 535, 541; 348/14.02; 455/556.1
See application file for complete search history.

(56) References Cited

U.S. PATENT DOCUMENTS

| | | | |
|---|---|---|---|
| 7,577,352 B2* | 8/2009 | Chang | 396/144 |
| 2005/0049019 A1* | 3/2005 | Lee | 455/575.4 |
| 2005/0054377 A1* | 3/2005 | Yeh | 455/556.1 |
| 2005/0261041 A1* | 11/2005 | Im | 455/575.3 |

* cited by examiner

*Primary Examiner*—W. B. Perkey
*Assistant Examiner*—Dennis Hancock
(74) *Attorney, Agent, or Firm*—Steven M. Reiss

(57) ABSTRACT

A camera module and a portable electronic device using same are provided. The camera module can be rotated to align with an aperture in the front of the device or an aperture in the rear of the device.

20 Claims, 5 Drawing Sheets

US 7,891,889 B2

CAMERA MODULE AND PORTABLE ELECTRONIC DEVICE USING SAME

BACKGROUND

1. Technical Field

The present disclosure relates to camera module, and particularly to a camera module used in a portable electronic device.

2. Description of Related Art

Camera modules are often provided in portable electronic devices, such as digital cameras, mobile phones, or personal digital assistants, to provide the device with an imaging function (e.g., still and/or video photography). A typical camera module includes a lens barrel and a lens assembly received in the lens barrel. The portable electronic device includes a camera window on its rear surface and a display on its front surface. The camera window is aligned with the lens assembly and allows the outside light to penetrate to the lens assembly for image capture by the camera module. However, it is difficult for a user to take a self-picture while simultaneously observing the image shown on the display.

Therefore, there is room for improvement within the art.

BRIEF DESCRIPTION OF THE DRAWING

Many aspects of the new camera module and portable electronic device using the same can be better understood with reference to the following drawings. The components in the drawings are not necessarily drawn to scale, the emphasis instead being placed upon clearly illustrating the principles of the new camera module and portable electronic device using the same. Moreover, in the drawings, like reference numerals designate corresponding parts throughout the several views.

DETAILED DESCRIPTION

Figure 1:
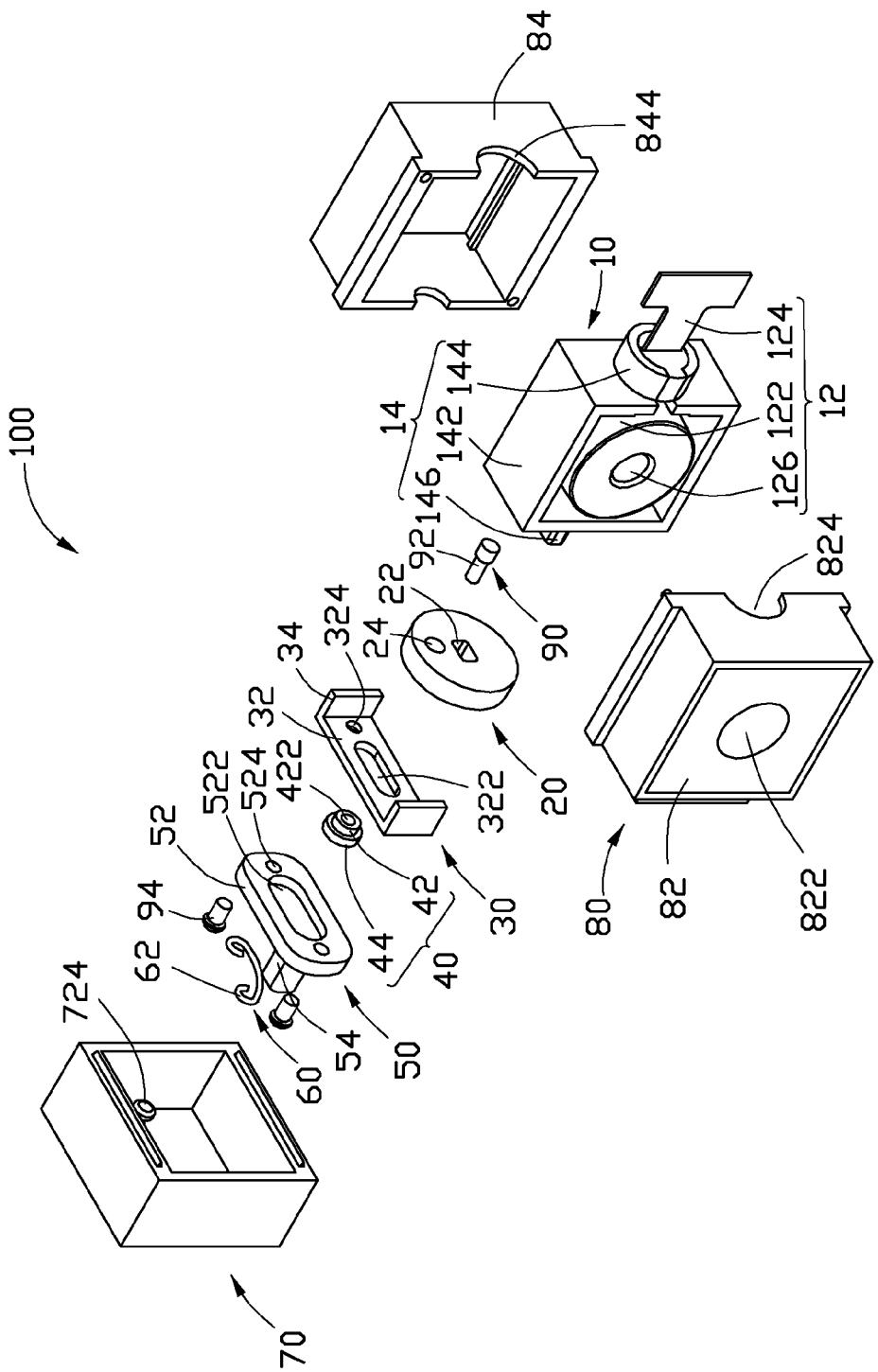
FIG. 1 is an exploded, isometric view of a camera module according to an exemplary embodiment.
Figure 2:
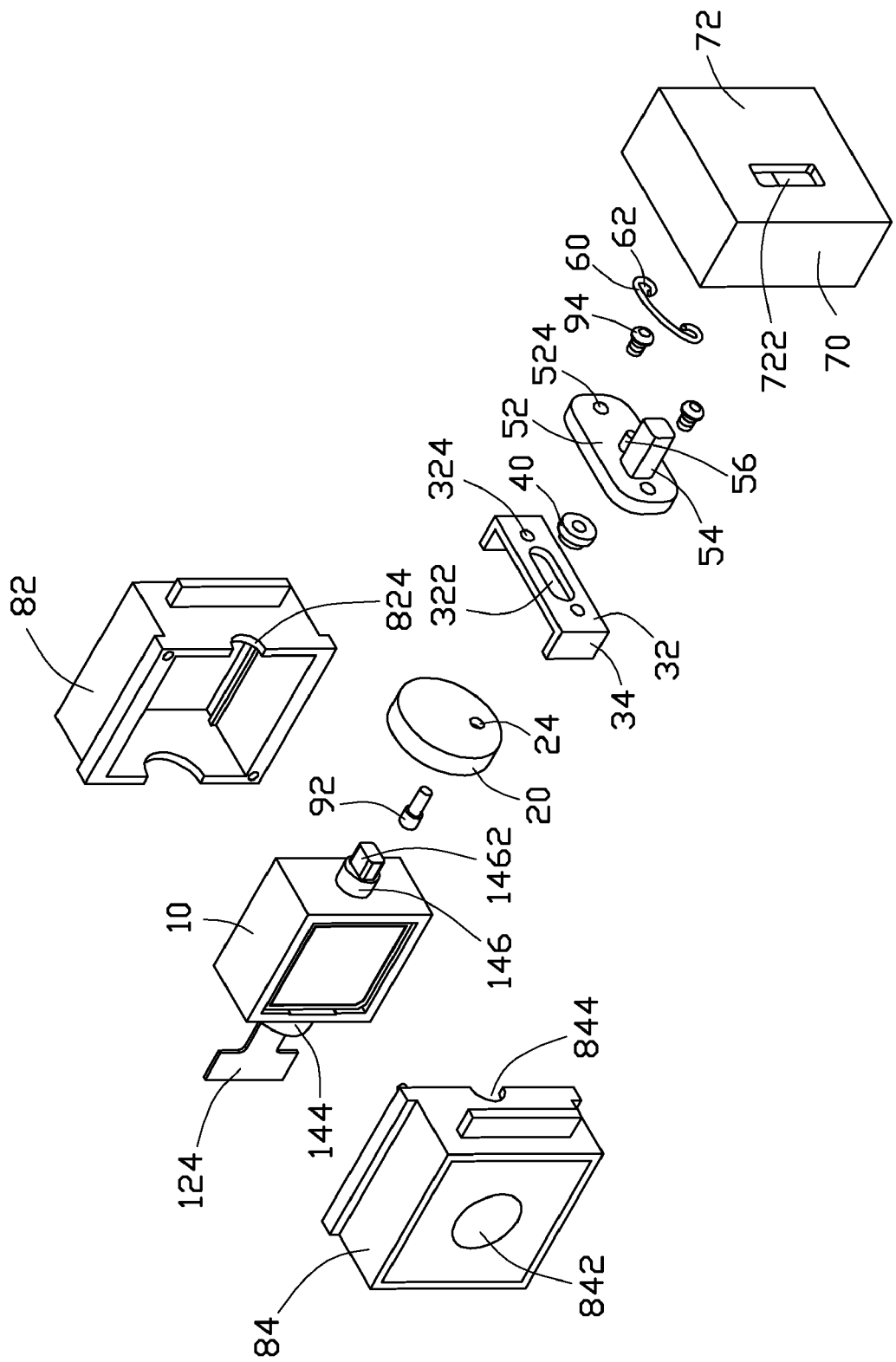
FIG. 2 is similar to FIG. 1 but viewed from another angle.
Figure 3:
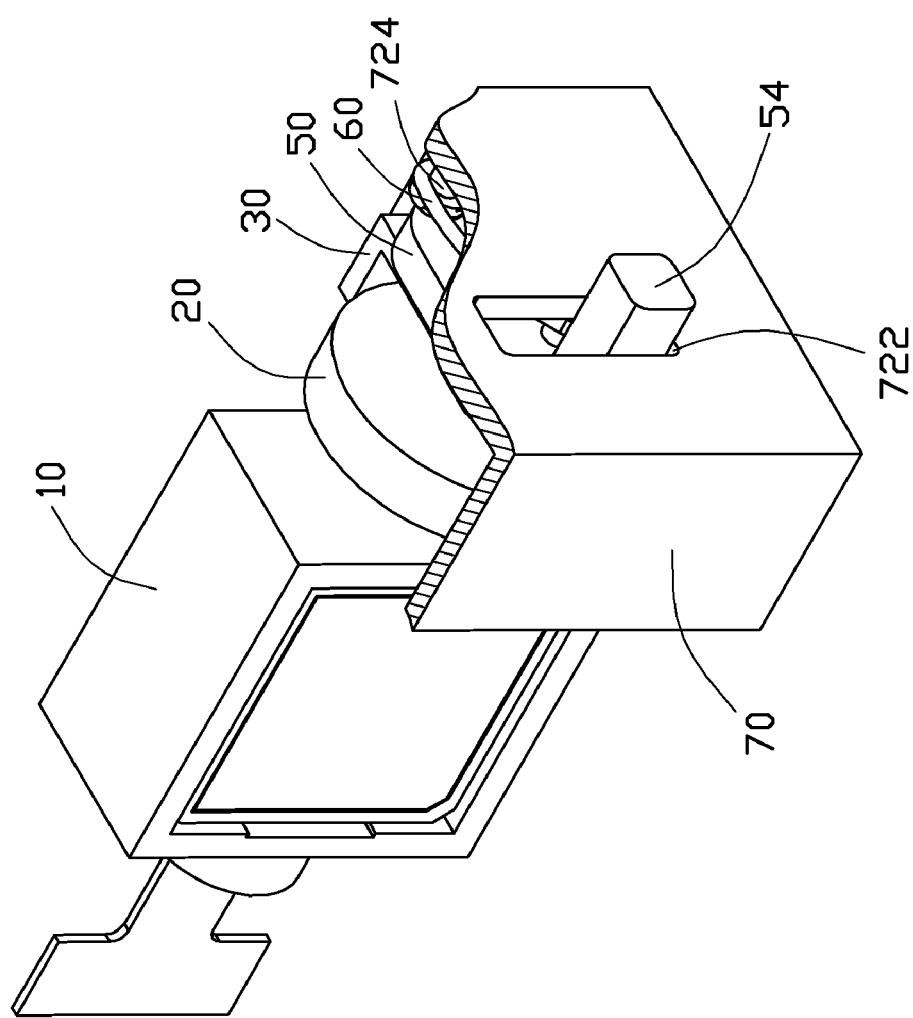
FIG. 3 is an assembled view of the camera module shown in FIG. 1.

FIGS. 1 through 3 show an exemplary camera module 100 including a camera unit 10, a rotary disk 20, a slidable frame 30, a positioning bolt 40, a handle member 50, an elastic member 60, a mounting member 70, receiving box 80, two positioning pins 90, and two fixing pins 94. The camera unit 10 is rotatably received in the receiving box 80. The rotary disk 20 is fixed to the camera unit 10. The positioning bolt 40 is secured to the rotary disk 20. The handle member 50 is fixed to the slidable frame 30. The elastic member 60 is secured to the handle member 50 and the mounting member 70.

The camera unit 10 includes an imaging unit 12 and a securing case 14. The securing case 14 secures the imaging unit 12 therein. The imaging unit 12 includes a lens barrel 122, a flexible printed circuit board 124, and a lens assembly 126. The lens assembly 126 is received in the lens barrel 122. The flexible printed circuit board 124 is rotatably secured to the lens barrel 122. The securing case 14 includes a peripheral wall 142, a sleeve portion 144, and a shaft portion 146. The sleeve portion 144 and the shaft portion 146 oppositely protrude from the peripheral wall 142. The sleeve portion 144 is hollow and communicates with the inside space of the securing case 14. Accordingly, the flexible printed circuit board 124 can pass through the sleeve portion 144, into the securing case 14 and secures into the lens barrel 122. The shaft portion 146 includes a securing portion 1462 for securing the rotary disk 20.

The rotary disk 20 defines a securing slot 22 at the center and a first positioning hole 24 offset from the securing slot 22. The securing slot 22 has substantially the same size and shape as the securing portion 1462. The securing portion 1462 is secured in the securing slot 22.

The slidable frame 30 includes a frame body 32 and two opposite bent portions 34 perpendicularly connected to the frame body 32. The frame body 32 defines a slot 322 and two first fixing holes 324 on two sides of the slot 322. The slot 322 slidably receives the positioning bolt 40.

The positioning bolt 40 includes a positioning end portion 42 and a cap portion 44 connecting the positioning end portion 42. The cap portion 44 covers the positioning end portion 42. The positioning end portion 42 is slidably received in and partially passes through the slot 322. The positioning end portion 42 defines a second positioning hole 422. The second positioning hole 422 has substantially the same size and shape as the first positioning hole 24.

The handle member 50 includes a base body 52, a handle portion 54 and a first hooking portion 56. The handle portion 54 and the first hooking portion 56 protrude from the same surface of the base body 52. The handle portion 54 is located near the flange of the base body 52. The first hooking portion 56 is located at the center of the base body 52 and secures the elastic member 60 in place.

The base body 52 defines an accommodating slot 522 opposite to the handle portion 54 and two through second fixing holes 524 on the two sides of the accommodating slot 522. The accommodating slot 522 has substantially the same length as the slot 322, and substantially the same width as the cap portion 44 of the positioning bolt 40. The cap portion 44 is received in the accommodating slot 522. The second fixing holes 524 has substantially the same size and shape as the first fixing holes 324 of the slidable frame 30 and the fixing pins 94. The fixing pins 94 can be secured in the second fixing holes 524 and the first fixing holes 324.

The elastic member 60 is a curved linear spring including two hooked ends 62. The two hooked ends 62 hook the first hooking portion 56 and the mounting member 70.

The mounting member 70 has the rotary disk 20, the slidable frame 30, the positioning bolt 40, the handle member 50, and the elastic member 60 mounted therein. The mounting member 70 include a bottom wall 72. The bottom wall 72 defines a slide slot 722 receiving the handle portion 54. The bottom wall 72 has a second hooking portion 724 protruding therefrom. The second hooking portion 724 is located inside the mounting member 70 for hooking the hooked end 62 of the elastic member 60.

The receiving box 80 receives the camera unit 10 and includes a first box section 82 and a second box section 84. The first box section 82 and the second box section 84 have generally the same structures. The first box section 82 defines a first aperture 822 allowing outside light to penetrate into the receiving box 80. The second box section 84 defines a second aperture 842 aligned with the first aperture 822 and also allowing outside light to penetrate into the receiving box 80. The first box section 82 defines two semi-circular, opposite first cutouts 824, accordingly, the second box section 84 defines two semi-circular, opposite second cutouts 844. The first cutouts 824 are aligned with the second cutouts 844. When the first box section 82 is attached to the second box section 84, the first cutouts 824 and the second cutouts 844 cooperatively define two circular spaces for rotatably receiving the sleeve portion 144 and the shaft portion 146, respectively.

The positioning pin 90 includes an elongated pin portion 92. The pin portion 92 has substantially the same shape and size as the first positioning hole 24 of the rotary disk 20 and the second positioning hole 422 of the positioning bolt 40. The fixing pins 94 have substantially the same shape and size as the second fixing holes 524 of the handle member 50 and the first fixing holes 324 of the slidable frame 30, respectively.

FIG. 3 shows the camera module 100 in an assembled state. The camera unit 10 is secured to the rotary disk 20 by a securing of the shaft portion 146 into the securing slot 22. The camera unit 10 is received in the receiving box 80 and can be rotated to align the lens assembly 126 with one of the first aperture 822 and the second aperture 842. The rotary disk 20 is secured to the positioning bolt 40 by securing of the pin portion 92 into the first positioning hole 24 and the second positioning hole 422. The slidable frame 30 is located between the rotary disk 20 and the positioning bolt 40. The positioning end portion 42 slidably engages the slot 322, accordingly, the positioning bolt 40 can slide relative to the slidable frame 30 along the slot 322.

The slidable frame 30 is fixed to the handle member 50 by fixing of the fixing pins 94 into the first fixing holes 324 and the second fixing holes 524. The mounting member 70 receives the rotary disk 20, the slidable frame 30, the positioning bolt 40, and the handle member 50. The elastic member 60 is deformed and secured between the bottom wall 72 of the mounting member 70 and the handle member 50. The hooked ends 62 hook the second hooking portion 724 and the first hooking portion 56, respectively. The handle portion 54 is exposed through the slide slot 722 and abuts the interior end wall of the slide slot 722 under the elastic force of the deformed elastic member 60.

In use, the handle portion 54 is pushed to slide along the slide slot 722. The slidable frame 30 moves along the extension direction of the slide slot 722. Due to the extension direction of the slide slot 722 being perpendicular to that of the slot 322, the positioning bolt 40 slides along the slot 322 to rotate the rotary disk 20 about the shaft portion 146. Accordingly, the elastic member 60 is further compressed. The camera unit 10 is rotated within the receiving box 80. The lens assembly 126 is rotated away from the first aperture 822 towards the second aperture 842.

When the handle portion 54 reaches at a predetermined position (i.e., at the middle of the slide slot 722), the elastic member 60 is compressed to accumulate a maximum potential elastic force. After the handle portion 54 passes the predetermined position, the potential elastic force is released to automatically drive the handle member 50 to move further along the slide slot 722. Accordingly, the slidable frame 30 slides further along with the handle member 50, and the positioning bolt 40 slides further along the slot 322 to further rotate the rotary disk 20. The camera unit 10 is further rotated within the receiving box 80 until the lens assembly 126 aligns with the second aperture 842. In this position, the handle portion 54 is retained by abutting the interior end wall of the slide slot 722 under the elastic force of the deformed elastic member 60. The positioning bolt 40 is retained by abutting the interior end wall of the slot 322.

Figure 4:
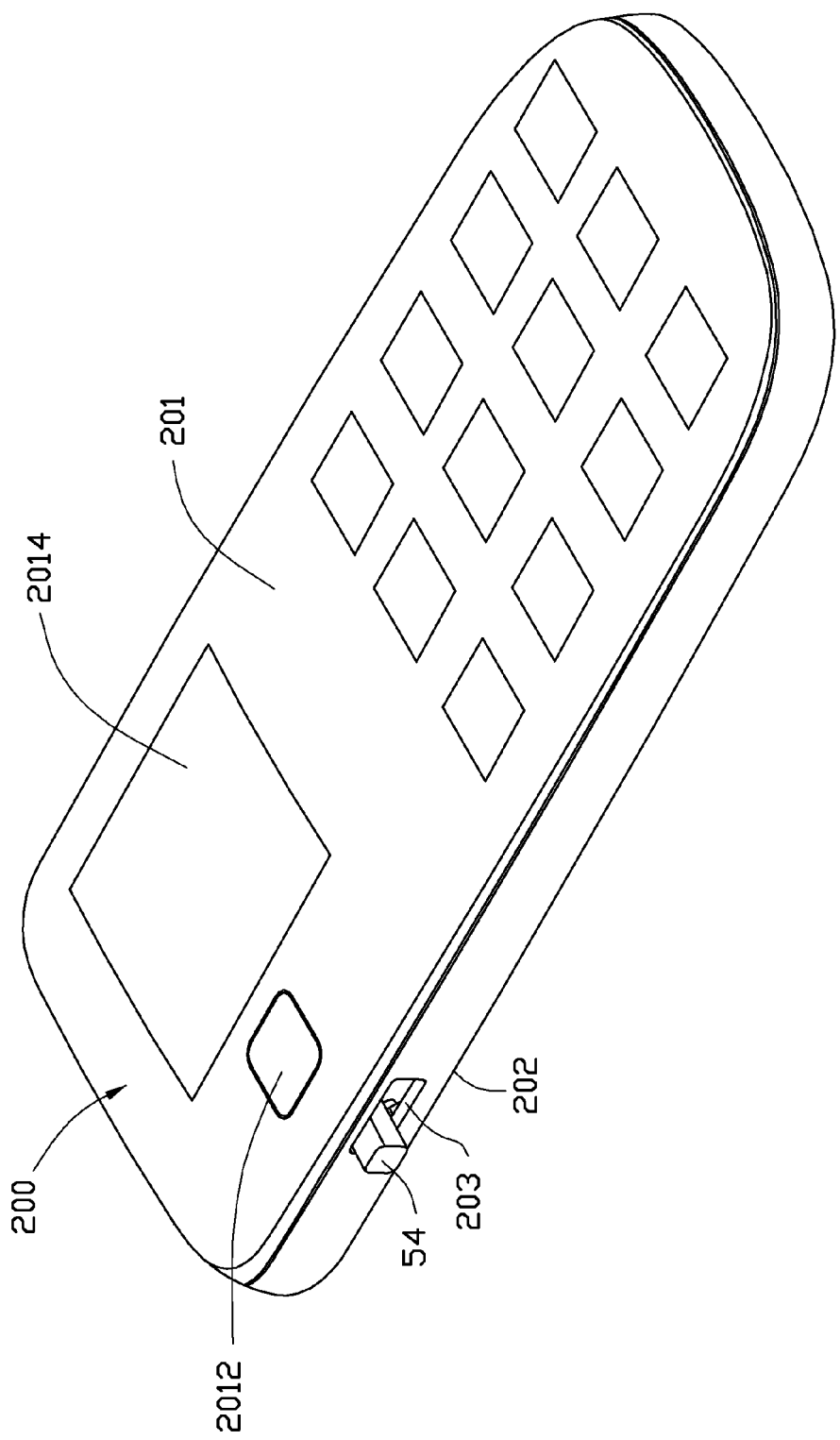
FIG. 4 is an isometric view of an exemplary portable electronic device using the camera module shown in FIGS. 1 through 3.
Figure 5:
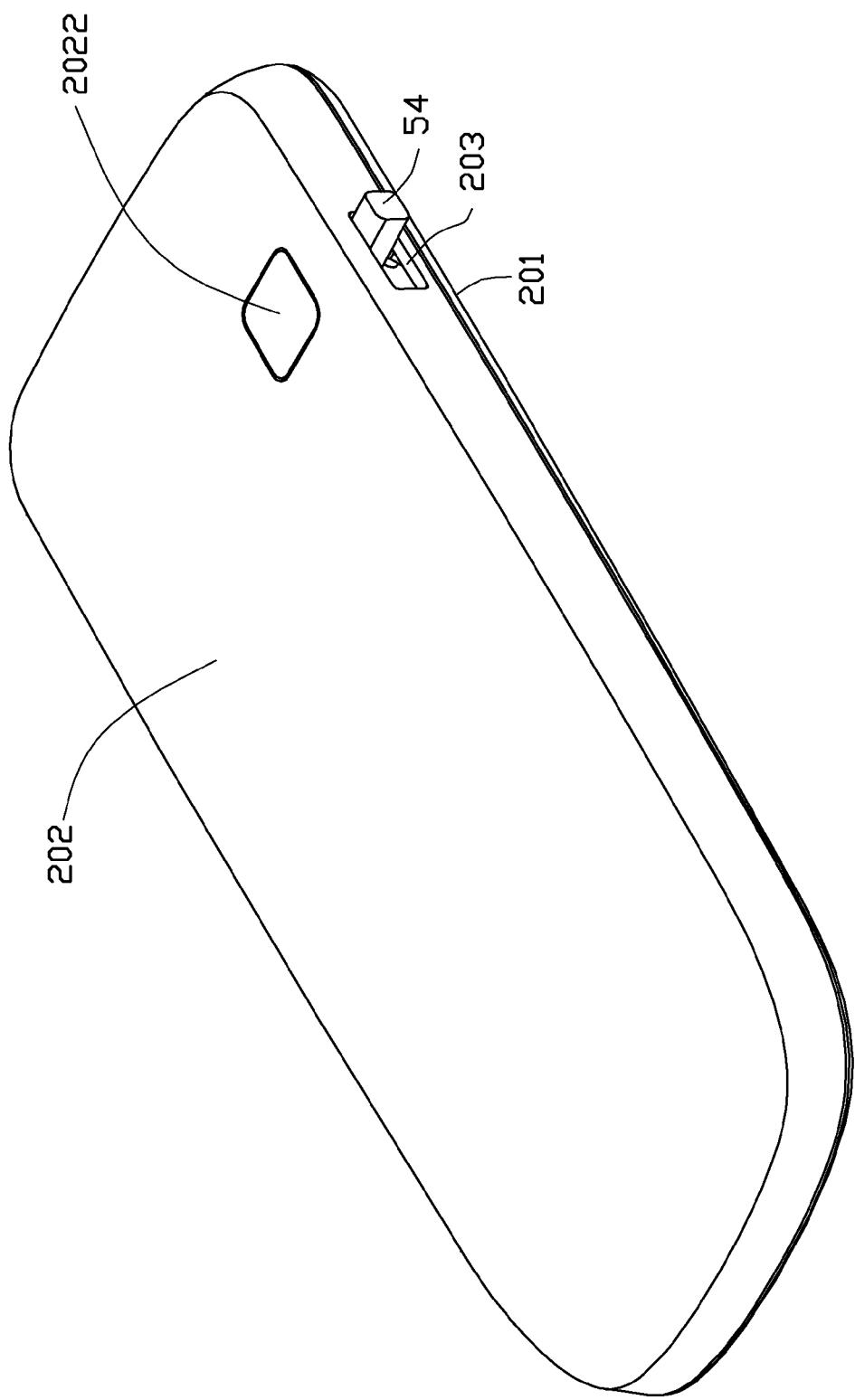
FIG. 5 is similar to FIG. 4 but viewed from another angle.

FIGS. 4 and 5 show an application of the camera module 100 in a portable electronic device 200. The portable electronic device 200 includes a front housing 201 and a rear housing 202. The front housing 201 has a first camera window 2012 and a display 2014. The rear housing 202 has a second camera window 2022 opposite to the first camera window 2012. The rear housing 202 defines an engaging slot 203 at the side.

During assembly, the camera module 100 is assembled inside the portable electronic device 200, exposing the handle portion 54 out of the engaging slot 203. The first box section 82 is secured to the front housing 201, and the second box section 84 is secured to the rear housing 202. The first aperture 822 of the receiving box 80 aligns with the first camera window 2012, and the second aperture 842 of the receiving box 80 aligns with the second camera window 2022. The slide slot 722 is aligned with the engaging slot 203.

In use, the handle portion 54 can be operated within the engaging slot 203. Accordingly, the camera unit 10 can be rotated to alternatively align the lens assembly 126 with the first camera window 2012 or the second camera window 2022.

It is to be understood, however, that even through numerous characteristics and advantages of exemplary embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A camera module, comprising
   a camera unit;
   a rotary disk fixed to the camera unit;
   a handle member comprising a handle portion;
   a slidable frame fixed to the handle member;
   a positioning bolt fixed to the rotary disk and slidably engaging the slidable frame;
   a mounting member defining a slide slot, the handle portion slidably engaging into the slide slot, the sliding of the handle portion relative to the slide slot is in a direction substantially perpendicular to the sliding of the positioning bolt relative to the slidable frame; and
   an elastic member secured to the mounting member and the handle member, the elastic member deformed to retain the handle portion within the slide slot, the elastic member further deformed to accumulate potential elastic force when the handle portion is slid along the slide slot, the accumulated potential elastic force then released to automatically drive the handle portion to slide further along the slide slot.

2. The camera module as claimed in claim 1, wherein the slidable frame defines a slot, the positioning bolt slidably engages into the slot, and the slot extends substantially perpendicularly to the slide slot.

3. The camera module as claimed in claim 2, wherein the camera unit is fixed to the center of the rotary disk, the positioning bolt is secured near an edge of the rotary disk.

4. The camera module as claimed in claim 3, wherein the camera unit comprises a shaft portion, the rotary disk defines a securing slot at the center, the shaft portion fixed in the securing slot.

5. The camera module as claimed in claim 3, further comprising a positioning pin, the rotary disk defining a first positioning hole near an edge of the rotary disk, the positioning bolt defining a second positioning hole, the positioning pin secured to the first positioning hole and the second positioning hole.

6. The camera module as claimed in claim 1, wherein:
the camera unit comprises a first box section and a second box section, the first box section defines a first aperture, the second box section defines a second aperture aligning with the first aperture;
the camera unit further comprises an imaging unit and a securing can, the imaging unit includes a lens barrel and a lens assembly, the lens assembly held by the lens barrel and rotated to alternatively align with the first aperture or the second aperture according to rotation of the rotary disk.

7. The camera module as claimed in claim 6, wherein the securing can has a shaft portion extending, the rotary disk defines a securing slot at the center, the shaft portion fixed in the securing slot.

8. The camera module as claimed in claim 1, further comprising fixing pins, the slidable frame defining first fixing holes, the handle member defining second fixing holes, the fixing pins fixed in the first fixing holes and the second fixing holes.

9. The camera module as claimed in claim 1, wherein the elastic member is a curved linear spring including two hooked ends, the two hooked ends hooking the handle member and the mounting member, the elastic member located between the handle member and the mounting member.

10. The camera module as claimed in claim 9, wherein:
the handle member further comprises a base body and a first hooking portion, the handle portion and the first hooking portion protruding from the same surface of the base body, the handle portion is located near the flange of the base body, the first hooking portion is located near the center of the base body and hooks one of the hooked ends; and
the mounting member comprises a bottom wall, the slide slot is defined through the bottom wall, the bottom wall has a second hooking portion protruding therefrom, the second hooking portion hooks the other of the hooked ends.

11. A portable electronic device, comprising:
a front housing comprising a first camera window;
a rear housing comprising a second camera window opposite to the first camera window and an engaging slot; and
a camera module secured in and located between the front housing and the rear housing, the camera module comprising:
a camera unit;
a rotary disk fixed to the camera unit;
a handle member comprising a handle portion, the handle portion exposing out of the engaging slot;
a slidable frame fixed to the handle member;
a positioning bolt fixed to the rotary disk and slidably engage the slidable frame;
a mounting member defining a slide slot, the handle portion slidably engaging into the slide slot, the sliding of the handle portion relative to the slide slot substantially perpendicular to the sliding of the positioning bolt relative to the slidable frame; and
an elastic member secured to the mounting member and the handle member, the elastic member deformed to retain the handle portion within the slide slot, the elastic member further deformed to accumulate potential elastic force when the handle portion is slid along the slide slot, the accumulated potential elastic force released to automatically drive the handle portion slide further along the slide slot.

12. The portable electronic device as claimed in claim 11, wherein the slidable frame defines a slot, the positioning bolt slidably engages into the slot, and the slot extends substantially perpendicularly to the slide slot.

13. The portable electronic device as claimed in claim 12, wherein the camera unit is fixed to the center of the rotary disk, the positioning bolt is secured near an edge of the rotary disk.

14. The portable electronic device as claimed in claim 13, wherein the camera unit comprises a shaft portion, the rotary disk defines a securing slot at the center, the shaft portion fixed in the securing slot.

15. The portable electronic device as claimed in claim 13, further comprising a positioning pin, the rotary disk defining a first positioning hole near an edge of the rotary disk, the positioning bolt defining a second positioning hole, the positioning pin secured to the first positioning hole and the second positioning hole.

16. The portable electronic device as claimed in claim 11, wherein:
the camera unit comprises a first box section and a second box section, the first box section defines a first aperture, the second box section defines a second aperture aligning with the first aperture, the first aperture and the second aperture alternately aligns with the first camera window and the second camera window, respectively;
the camera unit further comprises an imaging unit and a securing can, the imaging unit includes a lens barrel and a lens assembly, the lens assembly holds the lens barrel and is rotated to alternatively align with the first aperture or the second aperture according to rotation of the rotary disk.

17. The portable electronic device as claimed in claim 16, wherein the securing can has a shaft portion extending, the rotary disk defines a securing slot at the center, the shaft portion fixed in the securing slot.

18. The portable electronic device as claimed in claim 11, further comprising fixing pins, the slidable frame defining first fixing holes, the handle member defining second fixing holes, the fixing pins fixed in the first fixing holes and the second fixing holes.

19. The portable electronic device as claimed in claim 11, wherein the elastic member is a curved linear spring including two hooked ends, the two hooked ends hooking the handle member and the mounting member, the elastic member located between the handle member and the mounting member.

20. The portable electronic device as claimed in claim 19, wherein:
the handle member further comprises a base body and a first hooking portion, the handle portion and the first hooking portion protruding from the same surface of the base body, the handle portion is located near the flange of the base body, the first hooking portion is located at the center of the base body and hooks one of the hooked ends; and
the mounting member comprises a bottom wall, the slide slot is defined through the bottom wall, the bottom wall has a second hooking portion protruding therefrom, the second hooking portion hooks the other of the hooked ends.

* * * * *